US006929123B2

(12) United States Patent
Lau

(10) Patent No.: US 6,929,123 B2
(45) Date of Patent: Aug. 16, 2005

(54) SECURITY DISK CASE

(75) Inventor: Kwok Din Lau, Chai Wan (HK)

(73) Assignee: Finest Industrial Co., Ltd., Chai Wan (HK)

( * ) Notice: Subject to any disclaimer, the term of this patent is extended or adjusted under 35 U.S.C. 154(b) by 340 days.

(21) Appl. No.: 10/389,675

(22) Filed: Mar. 14, 2003

(65) Prior Publication Data

US 2004/0178091 A1 Sep. 16, 2004

(51) Int. Cl.$^7$ .............................................. B65D 85/57
(52) U.S. Cl. .................................. 206/308.1; 206/310
(58) Field of Search .............................. 206/307, 308.1, 206/309, 310, 311, 312, 472, 493

(56) References Cited

U.S. PATENT DOCUMENTS

| 5,531,322 | A | | 7/1996 | Iwaki et al. | |
|---|---|---|---|---|---|
| 6,065,593 | A | * | 5/2000 | Howerton et al. | 206/310 |
| 6,155,417 | A | | 12/2000 | Flores, Jr. et al. | |
| 6,237,763 | B1 | | 5/2001 | Lau | |
| 6,283,282 | B1 | * | 9/2001 | Wong et al. | 206/308.1 |
| 6,675,963 | B2 | * | 1/2004 | Myszka et al. | 206/308.2 |
| 6,681,930 | B1 | * | 1/2004 | Yang | 206/310 |
| 6,732,859 | B2 | * | 5/2004 | Kuremoto et al. | 206/308.1 |
| 6,776,282 | B2 | * | 8/2004 | Lafleur | 206/308.1 |
| 6,789,667 | B2 | * | 9/2004 | Belden et al. | 206/310 |
| 6,805,238 | B2 | * | 10/2004 | Iandoli et al. | 206/310 |
| 6,808,065 | B2 | * | 10/2004 | Chang | 206/308.1 |
| 6,837,370 | B2 | * | 1/2005 | Shindo et al. | 206/308.1 |
| 6,874,625 | B2 | * | 4/2005 | Chang | 206/308.1 |

FOREIGN PATENT DOCUMENTS

| EP | 1128387 | 8/2001 |
|---|---|---|
| JP | 6068641 | 3/1994 |
| JP | 6139741 | 5/1994 |
| JP | 6191582 | 7/1994 |
| JP | 9231722 | 9/1997 |

* cited by examiner

Primary Examiner—Kurt Fernstrom
(74) Attorney, Agent, or Firm—Sheldon & Mak; Denton L. Anderson

(57) ABSTRACT

A DVD disk case includes a hook connected to its base or lid and having an open position for clearing an outer disk perimeter during insertion and removal of the disk, and a closed position for blocking the removal of the disk. The hook opens when the lid is open, and the hook closes for securing the disk on a pedestal hub structure of the case when the lid is closed, to provide security by preventing removal of the disk from the case when the lid is proximately closed. The hook can project from the base, a lock projecting from the lid to displace the hook inwardly as the lid is move to its closed position. The hook can also include an inwardly extending lid tab of the lid and/or a projecting rib of a spine portion of the case.

19 Claims, 3 Drawing Sheets

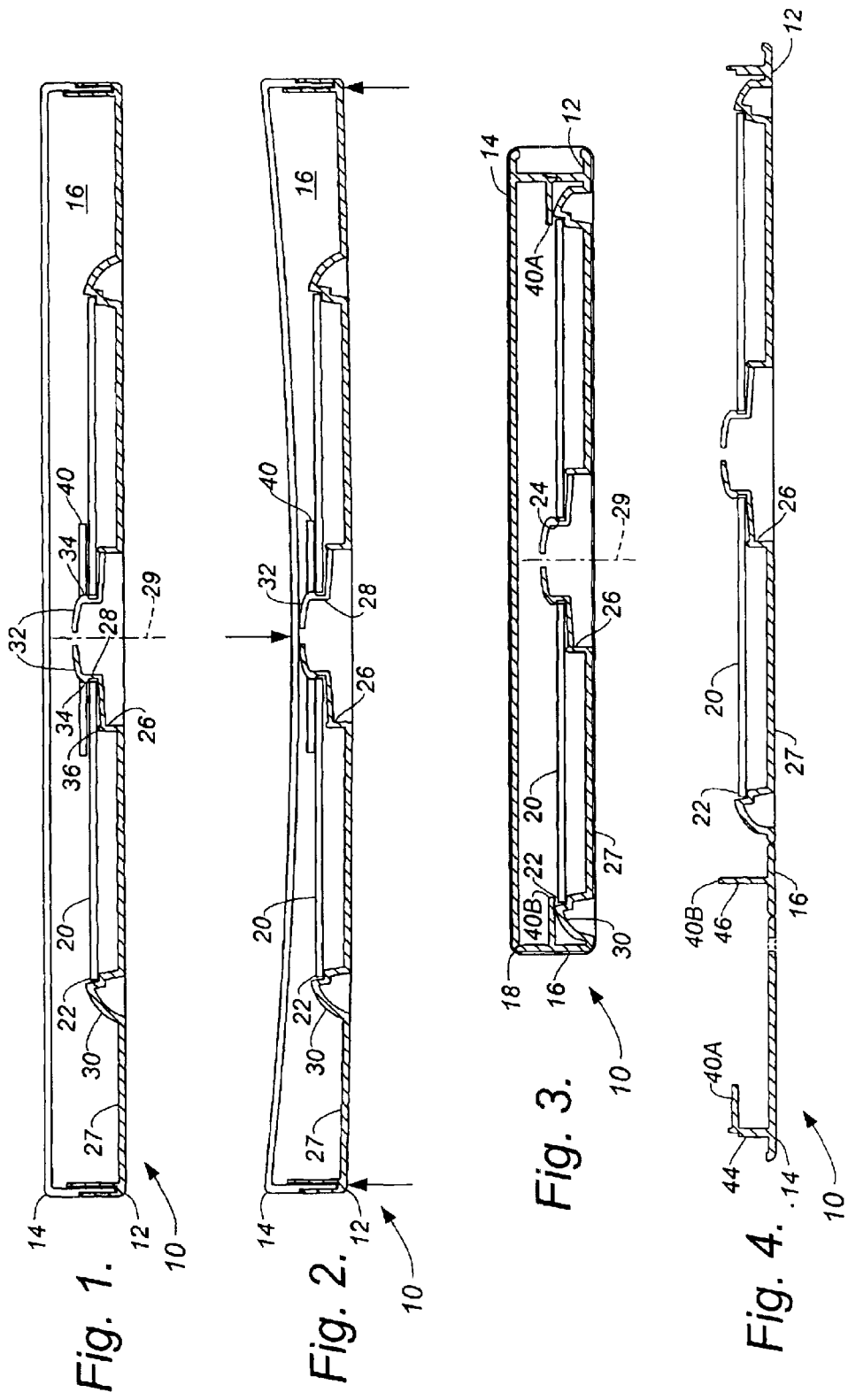

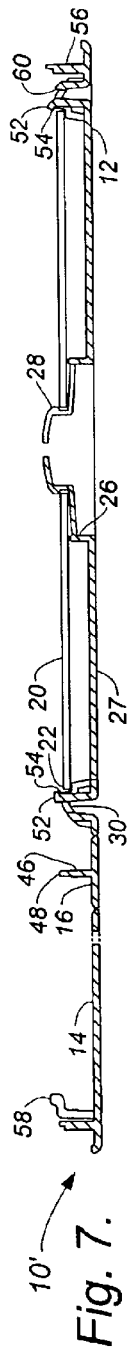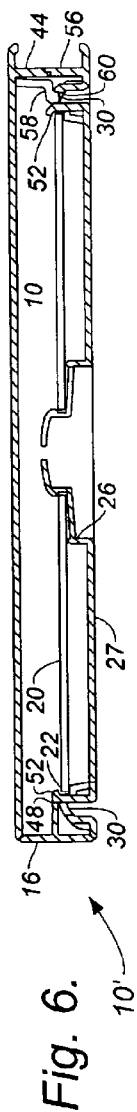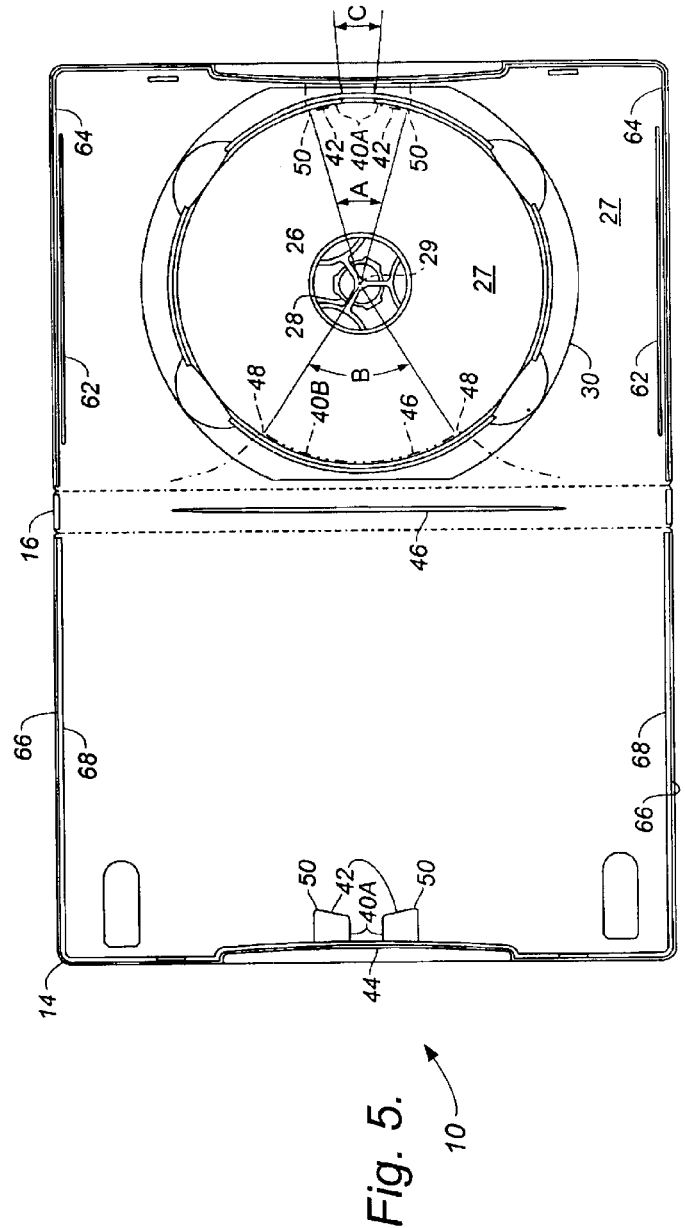

SECURITY DISK CASE

RELATED APPLICATION

This application is being filed on the same date as another application of the same inventor, entitled SECURITY DEVICE FOR A DISK BOX, which is incorporated herein by this reference.

BACKGROUND

The present invention relates to the packaging of optical data disks such as compact disks (CDs) and video disks (DVDs) that have central circular locating openings, and more particularly to cases for protectively enclosing such disks for storage of same.

Protective containers for CDs and DVDs in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions. See, for example, the present inventor's U.S. Pat. No. 6,237,763, which is incorporated herein by this reference. Cases such as those described are typically marketed with wrappers that normally prevent opening without removal of the wrapper (which is not supposed to happen until purchase transactions are completed).

It has recently been discovered that it is possible for a shoplifter to make a slit along the side of the wrapper, then deform the case in a manner that causes release of the disk from the pedestal, then, by prying the case slightly open, sliding the disk out of the case.

Thus there is a need for a way to prevent theft of disks from such containers in the manner described, and that is easy to use and inexpensive to provide.

SUMMARY

The present invention meets this need by providing storage cases having security features that effectively lock CDs and DVDs inside until the cases are substantially opened. These cases are of the type having a base portion and an openable lid portion, a pedestal projecting forwardly from the base including a button portion having a hub structure for releasably engaging a central opening of a disk being enclosed by the case. In one aspect of the invention, the storage case is characterized by the inclusion of a hook member connected to one of the base portion and the lid portion and having an open position for clearing the outer perimeter of the disk during engagement and removal of the disk from the hub structure, and a closed position for blocking the removal of the disk; means for moving the hook member to its open position when the lid portion is in the open condition; and means for securing the hook member in its closed position when the lid portion is in the closed position thereof thereby to provide security by preventing removal of the disk from the case when the disk is on the hub structure and the lid portion is proximate the closed position thereof.

The hook member can be connected to the base portion, the means for securing the hook member including a lock member projecting from the lid portion and displacing the hook member toward the pedestal as the lid portion is moved to the closed position thereof, the means for moving the hook member including the hook member being resiliently supported in the open position thereof by the base portion. Also, or in the alternative, the hook member can include a lid tab member rigidly connected to the lid portion, the means for securing including the lid tab member projecting inwardly of the outer perimeter of the disk and proximate the disk in the closed position of the lid portion, the means for moving the hook member including the lid tab member moving away from the base portion as the lid portion is moved to the open condition thereof.

The lid portion can be hingedly connected to the base portion, the hook member being located opposite the hinged connection from the pedestal. The hook member can be one of a spaced pair of hook members diagonally displaced from the pedestal opposite the hinged connection. The lid portion can be integrally formed with the base portion. The lid portion and the base portion can be formed with perimeter walls extending along respective ends of the case and along a side thereof opposite the hinged connection, a major portion of at least one of the perimeter walls including respective blade portions of the lid and base portions, the blade portions preferably projecting in facing overlapping relation when the lid portion is proximate the closed position thereof, for reinforcing the lid and base portions against bending thereof, and for further blocking removal of the disk from the container.

The hook member can be a primary hook member, the case further including a spine portion hingedly connected between the lid portion and the base portion, the case preferably also including a secondary hook member located proximate the spine member, means for securing the secondary hook member in a closed position thereof for further blocking removal of the disk from the case when the lid portion is proximate the closed position thereof, and means for moving the secondary hook member to an open position clearing the outer perimeter of the disk when the lid portion is in the open condition thereof, thereby securing the disk on opposite sides of the pedestal. The secondary hook member can be connected to the base portion, the means for securing the secondary hook member including a spine rib member projecting from the spine portion, the spine rib member displacing the secondary hook member toward the pedestal as the lid portion is moved to the closed position thereof, the means for moving the secondary hook member comprising the secondary hook member being resiliently supported in the open position thereof by the base portion. The secondary hook member can be one of a spaced pair of secondary hook members diagonally displaced from the pedestal proximate the spine portion connection.

The secondary hook member can include a spine rib member rigidly projecting from the spine portion, the means for securing including the spine rib member projecting inwardly of the outer perimeter of the disk and proximate the disk in the closed position of the lid portion, the means for moving the hook member including the rib member moving away from the base portion as the lid portion is moved to the open condition thereof. The spine rib member can extend to diagonally displaced extremities thereof relative to the pedestal and within the outer perimeter of the disk when the lid portion is proximate the closed position thereof. Also, the lid portion can be integrally formed with the base portion and the spine portion.

In another aspect of the invention, the storage case includes the base portion having the forwardly projecting pedestal portion with the button portion hub structure; the lid portion; the hingedly connected spine portion; the lid tab member connected to the lid portion opposite the pedestal portion from the spine portion and projecting inwardly of the outer perimeter of the disk in the closed position of the lid portion for blocking removal of the disk from the hub structure, the lid tab member moving away from the base portion as the lid portion is moved to its open condition; and a spine tab member connected to one of the lid portion and the spine portion near the spine portion and projecting inwardly of the outer perimeter of the disk in the closed position of the lid portion for further blocking removal of the disk from the hub structure, the spine tab member moving away from the base portion as the lid portion is moved to its open condition. The spine tab member can be rigidly connected to the spine portion.

In yet a further aspect, the storage case includes the base portion; the lid portion; the hingedly connected spine portion; a primary hook member movably connected to the base portion generally opposite the pedestal portion from the spine portion and having a closed position projecting inwardly of the outer perimeter of the disk, being biased to an open position for clearing the outer perimeter of the disk during engagement and removal of the disk from the hub structure; a lid lock member connected to the lid portion the lid lock member moving the primary lock member to the closed position thereof in the closed position of the lid portion for blocking removal of the disk from the hub structure, the lid lock member moving away from and allowing the primary hook member to return to the open position thereof as the lid portion is moved to the open condition thereof; a secondary hook member movably connected to the base portion generally near the spine portion and having a closed position projecting inwardly of the outer perimeter of the disk, being biased to an open position for clearing the outer perimeter of the disk during engagement and removal of the disk from the hub structure; a spine lock member connected to one of the lid portion and the spine portion and moving the secondary hook member to the closed position thereof in the closed position of the lid portion for further blocking removal of the disk from the hub structure, moving away from and allowing the secondary hook member to return to the open position thereof as the lid portion is moved to its open condition. The spine lock member can be rigidly connected to the spine portion. The primary hook member can be one of a spaced pair of primary hook members. The secondary hook member can be one of a spaced pair of secondary hook members.

DRAWINGS

These and other features, aspects, and advantages of the present invention will become better understood with reference to the following description, appended claims, and accompanying drawings, where:

FIG. 1 is side sectional view of a security disk case according to the present invention, the container enclosing a data storage disk;

FIG. 2 is a sectional view as in FIG. 1, showing the case being deformed in a manner designed to disengage the disk from supporting structure of the case;

FIG. 3 is an end sectional view of the case of FIG. 1;

FIG. 4 is an sectional view as in FIG. 3, showing the case of FIG. 1 in an open condition;

FIG. 5 is a plan view of the case of FIG. 1, in the open condition of FIG. 4;

FIG. 6 is a sectional view as in FIG. 3, showing an alternative configuration of the case of FIG. 1;

FIG. 7 is a sectional view as in FIG. 4, showing the case of FIG. 6 in an open condition;

DESCRIPTION

Figure 8:
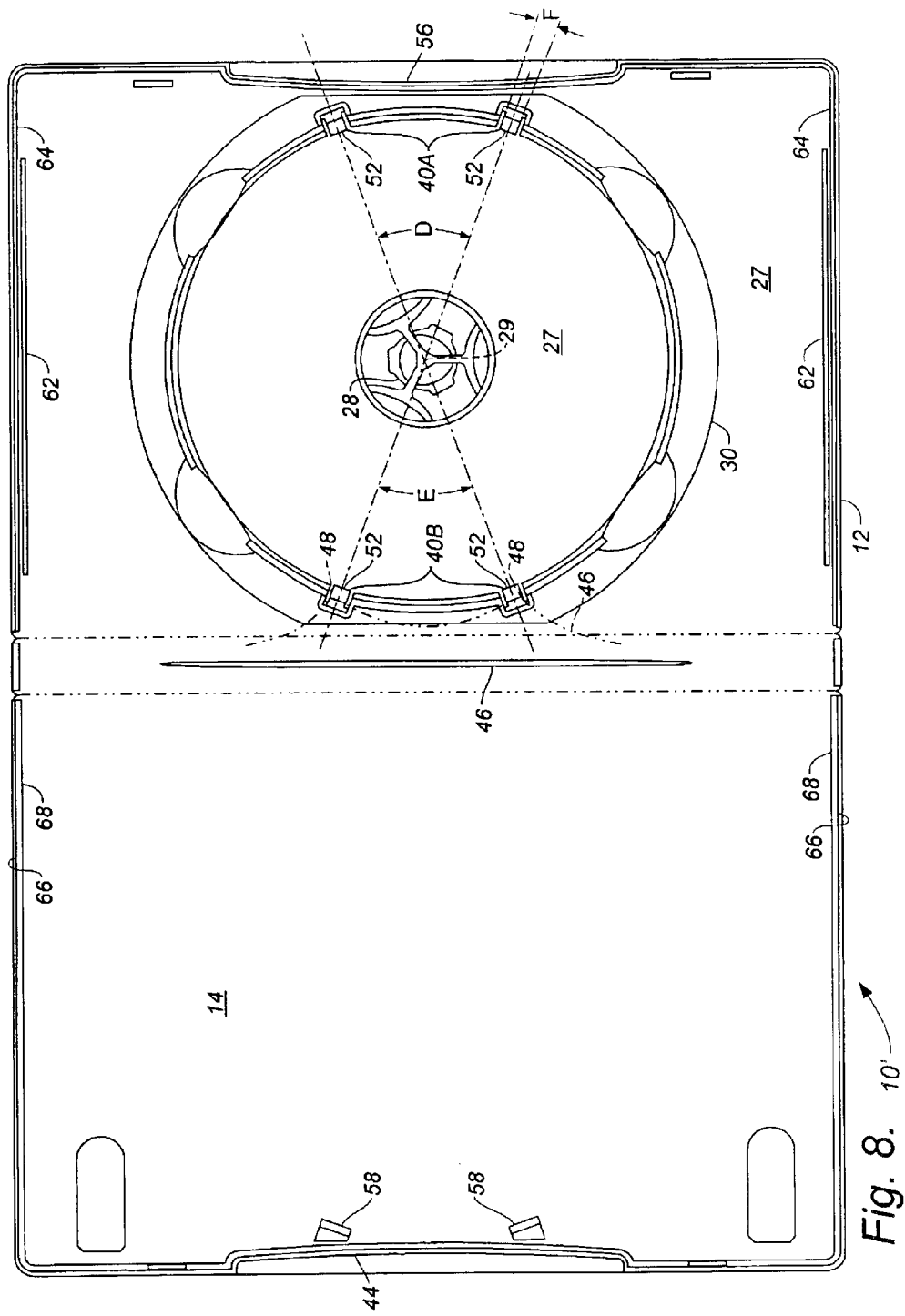
FIG. 8 is a plan view as in FIG. 5, of the case of FIG. 6.

The present invention is directed to a security disk storage case that is particularly effective for preventing theft of disks such as CDs and DVDs therefrom during storage and marketing of such disks. As indicated above, shoplifters are known to have made slits in side portions of disk case wrappers, succeeding in withdrawing disks from the cases while substantially closed by deforming the case in a manner that causes release of the disk from retaining pedestals of the cases, and then prying the case slightly open in the region of the slit. With reference to FIGS. 1–5 of the drawings, a security storage case 10 according to the present invention includes a base portion 12, a lid portion 14, and a spine portion 16 that is hingedly connected between the base and lid portions 12 and 14. The lid portion 14 has a closed position releasably engaging the base portion as shown in FIGS. 1 and 4, being openable to an open position as shown in FIG. 4. A wrapper 18 is normally used as shown in FIG. 3 to secure the lid portion 14 in its closed position with a disk 20 enclosed therein during storage and marketing of the disk, after which the jacket is typically removed and discarded, the case then being openable at will.

Typically, the storage case 10 is configured for conventional disks having an outer perimeter 22 of 120 mm diameter, a central opening 24 with an inside diameter of 15 mm, and a thickness of between 1.2 mm and 1.3 mm. The storage case also includes a pedestal 26 projecting forwardly from a rear panel 27 of the base portion 12, the pedestal having a hub structure 28 on a pedestal axis 29 for supportively engaging the disk 20 at the central opening 24 thereof. Typically also, the outer perimeter 22 of the disk is supported and/or stabilized by a forwardly projecting edge-support portion 30 of the base portion 12. Removal of the disk 20 is typically effected by manually accessing the outer perimeter 22 of the disk and/or the hub structure 28 of the case when the lid portion 14 is in an open condition being in the open position as shown in FIG. 4 or in beyond a partially open position that affords manual assess to the outer perimeter 22 and the hub structure 28.

While the hub structure 28 of the pedestal 26 can be variously configured, an exemplary form thereof includes a plurality of inwardly cantilevered button segments 32 that engage the central opening 24 of the disk 20, the button segments having outwardly projecting retainer portions 34 for releasably retaining the disk proximate a ring structure 36 that forms an outer portion of the pedestal 26. The cantilevered support of the button segments is sufficiently flexible for movement between a relaxed position shown in the drawings wherein the disk 20 is confined between the retainer portions and the ring structure, or wherein the disk can rest on the button portions 36, and a depressed position (not shown) wherein the retainer portions are displaced axially rearwardly and radially inwardly for clearing the central opening 24 of the disk 20 as described in the above-referenced U.S. Pat. No. 6,237,763. Other typical features of protective disk cases, such as clips for retaining literature inside such cases, living hinge connections between the spine portion 16 and the base and lid portions 12 and 14, and transparent jacket sheets for retaining externally visible labeling, are contemplated although not described.

As described above, an emergent problem is theft of disks, accomplished by slitting the wrapper, deforming the case to dislodge the disk from the pedestal, and slipping the disk out through the slit with the case pried slightly open in the region of the slit.

According to the present invention, the security case 10 is provided with hook means 40 projecting inwardly in front of the disk 20 proximate opposite sides of the outer perimeter 22 in the closed position of the lid portion 14 for blocking disengagement of the disk from the hub structure 28, the hook means 40 being displaced from in front of the disk when the case 10 is an open condition for allowing normal engagement and disengagement of the disk from the hub structure 28. As best shown in FIGS. 4 and 5, the hook means 40 in the exemplary configuration of FIGS. 1–5 includes first hook means 40A that is formed as a laterally spaced pair of tabs 42 that project inwardly from a lid side wall 44 of the lid portion 14 opposite the spine portion 16. The use of the separate spaced apart tabs 42 advantageously reduces concentrations of loading against the disk 20, while facilitating manufacture of the case 10 by limiting the size of openings through the lid portion 14 through which portions of a die protrude during molding to define a thickness of the tabs 42.

The hook means 40 also includes second hook means 40B in the form of a spine rib 46 of the spine portion 16, the rib 46 projecting sufficiently to extend in front of the outer perimeter 22. As shown by broken lines in FIG. 5, the rib 46 is preferably contoured for covering the disk 20 proximate the outer perimeter 22 thereof at a pair of spaced locations designated as rib extremities 48 (and therebetween), at an included angle B about the pedestal axis 29 for enhanced retention of the disk during deformation of the case 10, such retention being depicted in FIG. 2. Similarly, the tabs 42 of the first hook member 40A are contoured for covering the disk 20 at spaced tab extremities 50, at an included angle A as shown in FIG. 5. Further, the spacing between the tabs 42 forms an included angle C as also shown in FIG. 5. In the exemplary configuration of FIGS. 1–5, the angle A is approximately 32 degrees and the angle B is approximately 64 degrees, an average of angles A and B being approximately 48 degrees. Also, the angle C is approximately 10 degrees, the difference between the angle A and the angle C being approximately 22 degrees. It is preferred that each of the angles A and B be at least approximately 10 degrees, and that the angle A minus the angle C (if present) also be at least approximately 10 degrees, for limiting concentrations of loading against the disk 20, and for structural integrity of the tabs 42 and the spine rib 46. Also, it is preferred that the angle C be not greater than approximately 30 degrees for effective restraint of the disk in the region of the hub structure 28. It is further preferred that the average of the angles A and B be at least approximately 25 degrees.

With further reference to FIGS. 6–8, an alternative configuration of the security case, designated 10' has a plurality of hook members 52 projecting forwardly from the rear panel 27 of the base portion 12, the hook members 52 having respective relaxed positions as shown in FIG. 7 wherein hook extremities 54 thereof are displaced outwardly of the outer perimeter 22 of the disk 20 when the lid portion 14 is in an open condition. As shown in FIG. 8, one pair of the hook members 52, being located proximate a base side wall 56 of the base portion 12 opposite the spine portion 16, form counterparts of the first hook means 40A of the case 10, the hook extremities 54 thereof forming counterparts of the tab extremities 50 of the first hook means 40A. Similarly, another pair of the hook members 52, being located proximate the spine portion 16, form counterparts of the second hook means 40B of the case 10, the hook extremities 54 thereof forming counterparts of the tab extremities 50 of the second hook means 40B. A pair of hook actuators 58 project from the lid portion 14 proximate the lid side wall 44, the hook actuators 58 inwardly displacing the associated hook members 52 as the lid portion 14 moves into the closed position thereof as shown in FIG. 6. Also, the edge-support portion 30 of the base portion 12 is formed with respective support regions 60 that are spaced radially outwardly from the hook members 52, the hook actuators 58 being reinforced by supportive contact with the support regions 60 during the inward displacement of the hook members 52 of the first hook means 40A. The edge-support portion 30 is similarly formed adjacent the hook members 52 of the second hook means 40B; however, inward displacement of those hook members 52 is effected by contact with the spine rib 46 as the spine portion 16 assumes a position normal to the base panel 27 during closure of the lid portion 14, the spine rib 46 in the case 10' being formed correspondingly to the hook actuators 58 for displacing the hook members 52 of the second hook means 40B as indicated by broken lines in FIG. 8. As further shown in FIG. 8, the hook members 52 of the first hook means 40A are spaced apart, the hook members 52 of the second hook means 40B being correspondingly spaced apart opposite the hub structure 28, at respective included center-line angles D and E. In the exemplary configuration of FIGS. 6–8, the angles D and E are each approximately 40 degrees, and the hook members 52 have an effective circumferential contact width of approximately 3 mm, subtending an angle F of approximately 4 degrees about the pedestal axis 29. Thus the exemplary arrangement of FIGS. 6–8 corresponds to the Angles A and B being approximately 44 degrees, and the angle C in the configuration of FIGS. 1–5 being approximately 36 degrees, the difference between the angles A and C being 8 degrees. It will be understood that this smaller difference between the angles A and C is appropriate in that the hook members 52 are reinforced in their inwardly displaced positions by the hook actuators 58.

In further accordance with the present invention, opposite ends of the security case 10 of FIGS. 1–5 (as well as the case 10' of FIGS. 6–8) are provided with stiffening ribs that overlap in th closed position of the lid portion 14 for strengthening the case against warping and bending, as well as for providing added protection against entry of a knife blade or other unauthorized implement when the case is partially pried open. More particularly, a pair of base rib members 62 project forwardly from the base panel 27 in parallel spaced proximity to respective base end walls 64, and respective inwardly offset blade portion 66 of corresponding lid end walls 68 project between the base rib members 62 and the base end walls 64 to proximate the base panel 27 in the closed position of the lid portion 14.

Although the present invention has been described in considerable detail with reference to certain preferred versions thereof, other versions are possible. For example, a counterpart of the spine rib 46 can be formed in the lid portion 14 to serve as either the second hook means 40B or for actuating the hook members 52 of the second hook means 40B. Therefore, the spirit and scope of the appended claims should not necessarily be limited to the description of the preferred versions contained herein.

What is claimed is:

1. In a storage case of the type having a base portion and a lid portion engaging the base portion in a closed position of the lid portion, a forwardly projecting pedestal of the base portion including a button portion having a hub structure for releasably engaging a central opening of a disk having an outer perimeter with the disk being enclosed within the case when the lid portion is in the closed position, the lid portion being openable to at least an open condition for accessing the disk, characterized in that the case comprises:

(a) a hook member connected to one of the base portion and the lid portion, the hook member having an open position for clearing the outer perimeter of the disk during engagement and removal of the disk from the hub structure, and a closed position for blocking the removal of the disk;

(b) means for moving the hook member to the open position thereof when the lid portion is in the open condition; and (c) means for securing the hook member in the closed position thereof when the lid portion is in the closed position thereof thereby to provide security by preventing removal of the disk from the case when the disk is on the hub structure and the lid portion is proximate the closed position thereof.

2. The storage case of claim 1, wherein the hook member is connected to the base portion and the means for securing the hook member comprises a lock member projecting from the lid portion, the lock member displacing the hook member toward the pedestal as the lid portion is moved to the closed position thereof, the means for moving the hook member comprising the hook member being resiliently supported in the open position thereof by the base portion.

3. The storage case of claim 1, wherein the hook member comprises a lid tab member rigidly connected to the lid portion, the means for securing comprises the lid tab member projecting inwardly of the outer perimeter of the disk and proximate the disk in the closed position of the lid portion, the means for moving the hook member comprising the lid tab member moving away from the base portion as the lid portion is moved to the open condition thereof.

4. The storage case of claim 1, wherein the lid portion is hingedly connected to the base portion and the hook member is located opposite the hinged connection from the pedestal.

5. The storage case of claim 4, wherein the hook member is one of a spaced pair of hook members diagonally displaced from the pedestal opposite the hinged connection.

6. The storage case of claim 4, wherein the lid portion is integrally formed with the base portion.

7. The storage case of claim 4, wherein the lid portion and the base portion are formed with perimeter walls extending along respective ends of the case and along a side thereof opposite the hinged connection, a major portion of at least one of the perimeter walls including respective blade portions of the lid and base portions, the blade portions projecting in facing overlapping relation when the lid portion is proximate the closed position thereof, for reinforcing the lid and base portions against bending thereof, and for further blocking removal of the disk from the container.

8. The storage case of claim 1, wherein the hook member is a primary hook member, the case further comprising a spine portion hingedly connected between the lid portion and the base portion, a secondary hook member located proximate the spine member, means for securing the secondary hook member in a closed position thereof for further blocking removal of the disk from the case when the lid portion is proximate the closed position thereof, and means for moving the secondary hook member to an open position clearing the outer perimeter of the disk when the lid portion is in the open condition thereof.

9. The storage case of claim 8, wherein the secondary hook member is connected to the base portion and the means for securing the secondary hook member comprises a spine rib member projecting from the spine portion, the spine rib member displacing the secondary hook member toward the pedestal as the lid portion is moved to the closed position thereof, the means for moving the secondary hook member comprising the secondary hook member being resiliently supported in the open position thereof by the base portion.

10. The storage case of claim 9, wherein the secondary hook member is one of a spaced pair of secondary hook members diagonally displaced from the pedestal proximate the spine portion connection.

11. The storage case of claim 8, wherein the secondary hook member comprises a spine rib member rigidly projecting from the spine portion, the means for securing comprises the spine rib member projecting inwardly of the outer perimeter of the disk and proximate the disk in the closed position of the lid portion, the means for moving the hook member comprising the tab member moving away from the base portion as the lid portion is moved to the open condition thereof.

12. The storage case of claim 8, wherein the spine rib member extends to diagonally displaced extremities thereof relative to the pedestal and within the outer perimeter of the disk when the lid portion is proximate the closed position thereof.

13. The storage case of claim 8, wherein the lid portion is integrally formed with the base portion and the spine portion.

14. A storage case for a disk having a central opening and an outer perimeter, comprising:

(a) a base portion having a forwardly projecting pedestal portion including a button portion hub structure for releasably engaging the central opening of the disk;

(b) a lid portion;

(c) a spine portion hingedly connected between the base and lid portions, the lid portion having a closed position engaging the base portion, and an open condition;

(d) a lid tab member connected to the lid portion opposite the pedestal portion from the spine portion, the lid tab member projecting inwardly of the outer perimeter of the disk in the closed position of the lid portion for blocking removal of the disk from the hub structure, the lid tab member moving away from the base portion as the lid portion is moved to the open condition thereof; and (e) a spine tab member connected to one of the lid portion and the spine portion proximate the spine portion, the spine tab member projecting inwardly of the outer perimeter of the disk in the closed position of the lid portion for further blocking removal of the disk from the hub structure, the spine tab member moving away from the base portion as the lid portion is moved to the open condition thereof.

15. The storage case of claim 14, wherein the spine tab member is rigidly connected to the spine portion.

16. A storage case for a disk having a central opening and an outer perimeter, comprising:

(a) a base portion having a forwardly projecting pedestal portion including a button portion hub structure for releasably engaging the central opening of the disk;

(b) a lid portion;

(c) a spine portion hingedly connected between the base and lid portions, the lid portion having a closed position engaging the base portion, and an open condition;

(d) a primary hook member movably connected to the base portion generally opposite the pedestal portion from the spine portion, the primary hook member having a closed position projecting inwardly of the outer perimeter of the disk, the primary hook member being biased to an open position for clearing the outer perimeter of the disk during engagement and removal of the disk from the hub structure;

(e) a lid lock member connected to the lid portion, the lid lock member moving the primary lock member to the closed position thereof in the closed position of the lid portion for blocking removal of the disk from the hub structure, the lid lock member moving away from and allowing the primary hook member to return to the open position thereof as the lid portion is moved to the open condition thereof;

(f) a secondary hook member movably connected to the base portion generally proximate the spine portion, the secondary hook member having a closed position projecting inwardly of the outer perimeter of the disk, the secondary hook member being biased to an open position for clearing the outer perimeter of the disk during engagement and removal of the disk from the hub structure;

(g) a spine lock member connected to one of the lid portion and the spine portion, the spine lock member moving the secondary hook member to the closed position thereof in the closed position of the lid portion for further blocking removal of the disk from the hub structure, the spine lock member moving away from and allowing the secondary hook member to return to the open position thereof as the lid portion is moved to the open condition thereof.

17. The storage case of claim 16, wherein the spine lock member is rigidly connected to the spine portion.

18. The storage case of claim 16, wherein the primary hook member is one of a spaced pair of primary hook members.

19. The storage case of claim 16, wherein the secondary hook member is one of a spaced pair of secondary hook members.

* * * * *